United States Patent

Jakoubovitch

[11] Patent Number: 5,940,263
[45] Date of Patent: Aug. 17, 1999

[54] POWER CAPACITOR BANK SWITCHING DEVICES

[76] Inventor: Albert Jakoubovitch, FOS F-34320 Roujan, Roujan, France

[21] Appl. No.: 08/750,583
[22] PCT Filed: Mar. 15, 1996
[86] PCT No.: PCT/FR96/00405
§ 371 Date: Aug. 14, 1997
§ 102(e) Date: Aug. 14, 1997
[87] PCT Pub. No.: WO96/29714
PCT Pub. Date: Sep. 26, 1996

[30] Foreign Application Priority Data

Mar. 23, 1995 [FR] France ................... 95 03586

[51] Int. Cl.⁶ ............... H01G 4/38; H02B 1/01
[52] U.S. Cl. .......... 361/328; 361/830; 361/831; 361/68; 361/689; 361/330
[58] Field of Search ................. 361/328–330, 361/688–689, 698–699, 711, 715–717, 830–831, 309, 306.1; 174/68.2, 72 B, 70 B

[56] References Cited

U.S. PATENT DOCUMENTS 5,214,564 5/1993 Metzler et al. .

FOREIGN PATENT DOCUMENTS

| 2341188 | 9/1977 | France . |
| 2732156 | 9/1996 | France . |
| 8802745 | 2/1989 | Germany . |
| 91/07075 | 5/1991 | WIPO . |
| 92/13355 | 8/1992 | WIPO . |
| 9317439 | 9/1993 | WIPO . |
| 95/22155 | 8/1995 | WIPO . |
| 96/29714 | 9/1996 | WIPO . |

*Primary Examiner*—Kristine Kincaid
*Assistant Examiner*—Anthony Dinkins
*Attorney, Agent, or Firm*—Frijouf, Rust & Pyle, P.A.

[57] ABSTRACT

A device is disclosed for connecting a plurality of capacitors between a first and a second terminal. The device includes a plurality of bus bars located in a parallel spaced apart relationship. A plurality of fasteners fasten the plurality of capacitors between adjacent bus bars. A plurality of shims are interposed between selected bus bars and the first and second terminal for electrically connecting the plurality of capacitors between the first and second terminals.

11 Claims, 1 Drawing Sheet

POWER CAPACITOR BANK SWITCHING DEVICES

BACKGROUND OF THE INVENTION

1. Field of the Invention

This invention relates to power capacitors and more particularly to a system for connecting power capacitors in a parallel, serial or a serial-parallel grouping.

2. Information Disclosure Statement

The appearance of power transistors and silicon controlled rectifiers (SCR) has resulted in an evolution of the generators used for inductive heating. The supply voltages for these switching devices are usually less than 1,000 V. As a result, the voltages supplied by transistor based or SCR based inductive heating generators are less than 1,000×q2, or about 700 V. In practice, most of these power sources deliver voltages ranging from 250 to 700 V.

The need to use an inductor, or a reactor, to transfer the power from the generator to the load to be heated, necessitates the creation of a reactive power whose value is usually 8 to 40 times higher than the active power. Consequently, it is necessary to have capacitor banks combined with the inductor, with characteristics allowing high currents to be supplied at voltage levels less than 700 V. The operating frequencies of these devices are usually in the range of 40 to 400 kHz.

One of the classical means to form such banks consists in mounting in parallel capacitors with the highest possible capacitance and capable of delivering currents of a few ten to a few hundred amperes. Unfortunately, the assembling of a high number of elements presents several technical problems.

The large magnetic fields produced by each capacitor in the bank may cause the heating by induction of the capacitors located close to the bank output terminals. The use of capacitors with high capacitance values may produce resonance possibilities between two or several capacitors in the bank. This phenomenon, when occurring, will destroy the bank elements.

The capacitors in the bank are usually arranged between two copper plates cooled by water circulation. As a consequence, the whole bank or the greatest part of it will have to be disassembled to replace a capacitor.

The parallel mounting of a large number of capacitors results in the creation of a high current that must be conveyed to the bank output terminals through connecting means designed to generate a negligible ohmic and inductive voltage drop. These conditions are difficult to achieve.

Therefore, it is an object of the present invention to provide an improved power capacitor bank switching device which overcomes the aforementioned problems of the prior art and provides a significant contribution to the power capacitor art.

Another object of this invention is to provide an improved power capacitor bank switching device that enables a plurality of power capacitors to be connected in a parallel, serial or a serial-parallel grouping.

Another object of this invention is to provide an improved power capacitor bank switching device that enables a plurality of power capacitors to be readily reconnected in a parallel, serial or a serial-parallel grouping.

Another object of this invention is to provide an improved power capacitor bank switching device that enables a plurality of power capacitors to be connected in a parallel, serial or a serial-parallel grouping with a negligible ohmic and inductive voltage drop.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved device for connecting a plurality of capacitors between a first and a second terminal. The device comprises a plurality of bus bars with the plurality of bus bars being located in a parallel spaced apart relationship. A plurality of fasteners fasten the plurality of capacitors between adjacent bus bars. A plurality of shims are interposed between selected bus bars and the first and second terminal for electrically connecting the plurality of capacitors between the first and second terminals.

In a more specific embodiment of the invention, the first and second terminals are adapted for receiving an inductor. Each of the plurality of bus bars is formed from a thermally and electrically conductive metal. Preferably, each of the plurality of bus bars includes an internal channel defined within each of the plurality of bus bars for receiving cooling water for cooling the bus bar thereby.

Each of the plurality of fasteners fastening the plurality of capacitors between adjacent bus bars includes a plurality of fastening screws. The plurality of shims are interposed between selected bus bars and the first and second terminal. A plurality of terminal fasteners secure the plurality of shims between the bus bars and the first and second terminals.

In one embodiment of the invention, each of the plurality of bus bars and the plurality of shims and the first and second terminal have aligned fastening holes. Aa plurality of terminal fasteners extend through the aligned fastening holes for securing the plurality of shims between the bus bars and the first and second terminals. Each of the plurality of bus bars includes a T-shaped piece for connection to the first and second terminal through the plurality of shims.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
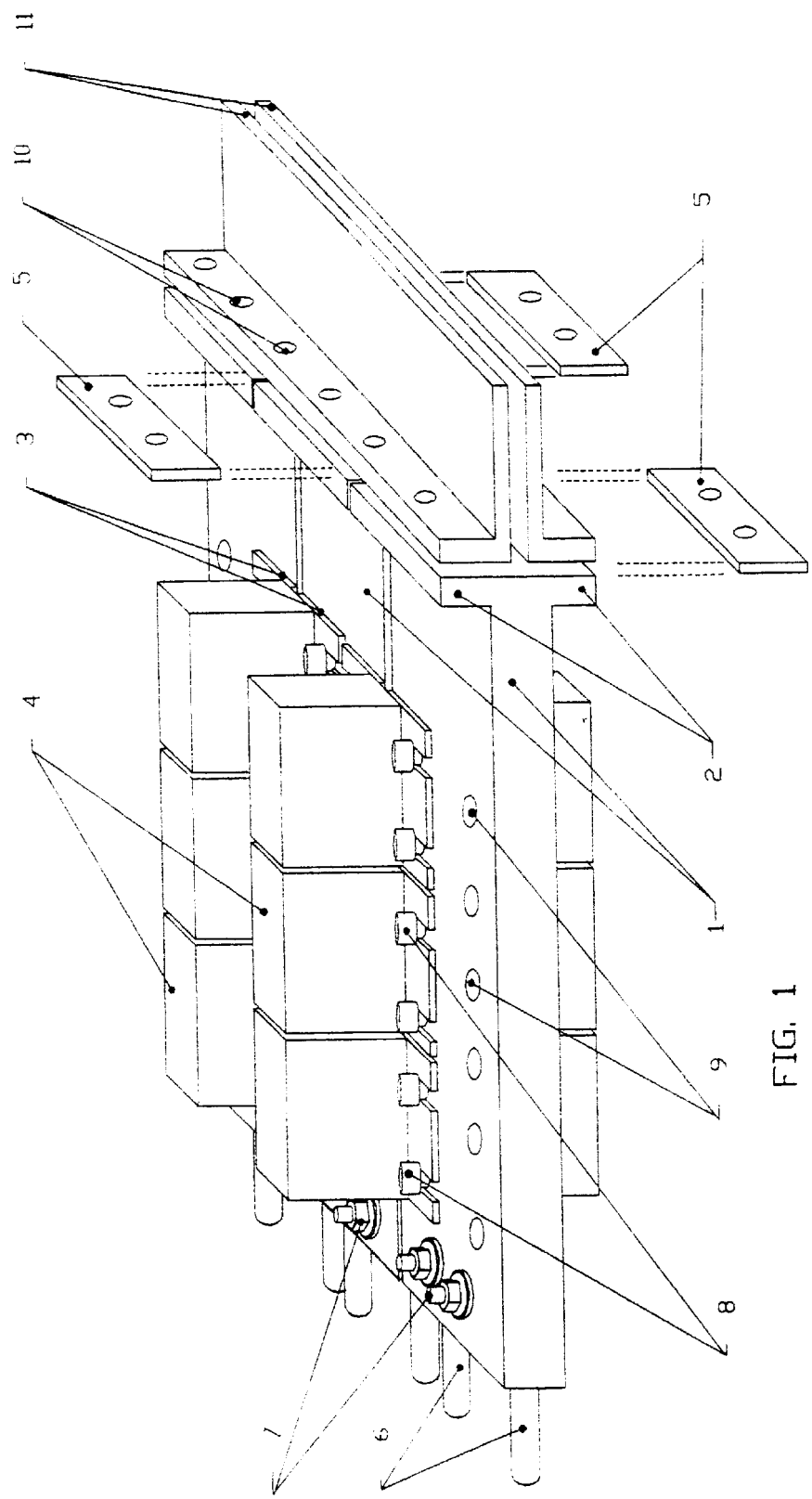
FIG. 1 is an isometric view of the power capacitor bank switching devices of the present invention.

This system deals with a means for parallel, serial or serial-parallel grouping in any number of power capacitors cooled by conduction. The purpose of this device is to reduce to a negligible value the inductance of the connecting terminals as well as the magnetic field generated by the currents flowing from each capacitor. Whilst mainly intended for inductive heating applications, this device also allows the connection of the capacitor bank to the user inductor.

The device under this patent is mainly comprised of at least two metal bars (1) made of a thermally and electrically conductive material, including the fastening means (8 and 9) for the capacitors (4) and cooled down by water circulation through a channel (12) bored through the whole length of the bar (1).

Each bar is terminated by a solid plate (2) fastened perpendicular to the bar (1) and provided for connection onto the terminals of the bank (11) by means of metal shims (3). The arrangement of the shims (5) allows switching the capacitors fastened onto the bars (1) into parallel, serial or serial-parallel connection.

Figure 2:
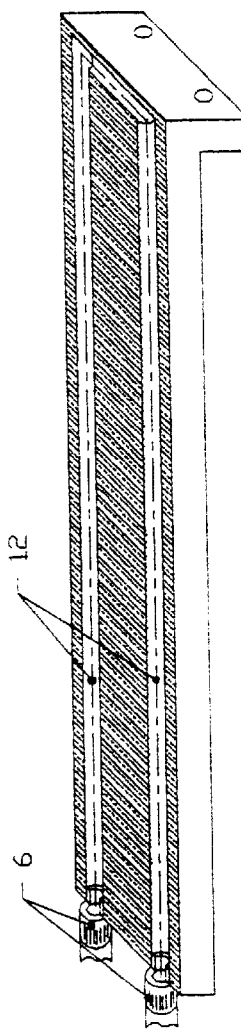
FIG. 2 is a cut away view of a bus bar of FIG. 1.

The device according to the present invention allows all these problems to be solved. It will be described, as a non restrictive example, by reference to FIGS. 1 and 2 showing the device according to the invention.

The device is mainly comprised of two or several bars (1) made of a thermally and electrically conductive metal cooled by channels (12) connected to a cooling water circuit by means of tubes (6). The electrodes (3) of the capacitors (4) are laid out astride two bars (1) having threaded holes (9) by means of fastening screws (8).

The capacitors (4) can be arranged in any number, either on one side or on both sides of the cooling bars (1). The distance between the bus bars cooled by water circulation is reduced down to a gap about 1 to 5 mm wide in order to confine the magnetic field created by the current flowing from each capacitor between the bars. The magnetic field created by the large currents flowing between the bus bars (1) becomes then little disturbing. It is thus possible to form assemblies with over 1,000 KVAR 20 reactive power in volumes of about 0.1 cubic foot.

The bar ends are fitted with terminals (7) for connection onto the power source. On its opposite end, each bar is fitted with a solid T-shaped piece (2). This piece is provided for connection through copper shims (5) onto the high current terminals (11) of the bank by means of the fastening holes (10) bored in the terminals (11). Depending on their respective position, the shims (5) allow the connection of any of the high current bars (1) onto the terminals (11). Depending on the arrangement of the shims, the banks can be parallel, series or series-parallel connected.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

I claim:

1. A device for connecting a plurality of capacitors between a first and a second terminal, comprising:

a plurality of bus bars;

said plurality of bus bars being located in a parallel spaced apart relationship;

a plurality of fasteners for fastening the plurality of capacitors between adjacent ones of said bus bars; and a plurality of shims interposed between selected ones of said bus bars and said first and second terminals for electrically connecting the plurality of capacitors between the first and second terminals.

2. A device for connecting a plurality of capacitors as set forth in claim 1, wherein the first and second terminals are adapted for receiving an inductor.

3. A device for connecting a plurality of capacitors as set forth in claim 1, wherein each of said plurality of bus bars is formed from a thermally and electrically conductive metal.

4. A device for connecting a plurality of capacitors as set forth in claim 1, wherein each of said plurality of bus bars includes an internal channel defined within each of said plurality of bus bars for receiving cooling water for cooling said bus bar thereby.

5. A device for connecting a plurality of capacitors as set forth in claim 1, wherein each of said plurality of fasteners for fastening the plurality of capacitors between adjacent ones of said bus bars includes a plurality of fastening screws.

6. A device for connecting a plurality of capacitors as set forth in claim 1, wherein said plurality of shims interposed between selected ones of said bus bars and said first and second terminals; and a plurality of terminal fasteners for securing said plurality of shims between said bus bars and the first and second terminals.

7. A device for connecting a plurality of capacitors as set forth in claim 1, wherein each of said plurality of bus bars and said plurality of shims and the first and second terminals have aligned fastening holes; and a plurality of terminal fasteners extending through said aligned fastening holes for securing said plurality of shims between said bus bars and the first and second terminals.

8. A device for connecting a plurality of capacitors as set forth in claim 1, wherein each of said plurality of bus bars includes a T-shaped piece for connection to the first and second terminals through said plurality of shims.

9. A device for connecting a plurality of capacitors between a first and a second terminal, comprising:

a plurality of bus bars with each of said plurality of bus bars being formed from a thermally and electrically conductive metal;

an internal channel defined within each of said plurality of bus bars for receiving cooling water for cooling said bus bar thereby;

said plurality of bus bars being located in a parallel spaced apart relationship;

a plurality of fasteners for fastening the plurality of capacitors between adjacent ones of said bus bars;

each of said plurality of bus bars having a T-shaped piece;

a plurality of shims with each of said plurality of shims being formed from a thermally and electrically conductive metal;

each of said T-shaped piece of said plurality of bus bars and said plurality of shims and the first and second terminals having aligned fastening holes; and a plurality of terminal fasteners extending through said aligned fastening holes for securing said plurality of shims between selected T-shaped pieces of said plurality of bus bars and the first and second terminals for electrically connecting the plurality of capacitors between the first and second terminals.

10. A device for connecting a plurality of capacitors as set forth in claim 9, wherein the first and second terminals are adapted for receiving an inductor.

11. A device for connecting a plurality of capacitors as set forth in claim 9, wherein each of said plurality of fasteners for fastening the plurality of capacitors between adjacent ones of said bus bars includes a plurality of fastening screws.

* * * * *